United States Patent
Wu et al.

(10) Patent No.: US 10,317,536 B2
(45) Date of Patent: Jun. 11, 2019

(54) TECHNIQUES FOR AFFECTING A WIRELESS SIGNAL-BASED POSITIONING CAPABILITY OF A MOBILE DEVICE BASED ON ONE OR MORE ONBOARD SENSORS

(71) Applicant: QUALCOMM Incorporated, San Diego, CA (US)

(72) Inventors: Jie Wu, San Diego, CA (US); Wyatt Riley, Chesterbrook, PA (US); William Morrison, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 499 days.

(21) Appl. No.: 15/141,674

(22) Filed: Apr. 28, 2016

(65) Prior Publication Data

US 2016/0245922 A1    Aug. 25, 2016

Related U.S. Application Data (62) Division of application No. 13/622,818, filed on Sep. 19, 2012, now Pat. No. 9,354,324.

(60) Provisional application No. 61/549,539, filed on Oct. 20, 2011.

(51) Int. Cl.
| | | |
|---|---|---|
| *G01S 19/25* | (2010.01) | |
| *G01S 19/46* | (2010.01) | |
| *G01S 19/20* | (2010.01) | |
| *G01S 19/49* | (2010.01) | |
| *G01S 19/05* | (2010.01) | |

(52) U.S. Cl.
CPC .............. *G01S 19/25* (2013.01); *G01S 19/05* (2013.01); *G01S 19/20* (2013.01); *G01S 19/46* (2013.01); *G01S 19/49* (2013.01)

(58) Field of Classification Search
CPC .......... G01S 19/25; G01S 19/05; G01S 19/20; G01S 19/46; G01S 19/49; G01S 19/13; G01C 21/165; G01C 15/00; G01C 21/28
USPC ...................................... 342/357.32
See application file for complete search history.

(56) References Cited

U.S. PATENT DOCUMENTS

| | | | |
|---|---|---|---|
| 4,903,212 | A | 2/1990 | Yokouchi et al. |
| 5,742,925 | A | 4/1998 | Baba |
| 6,175,806 | B1 | 1/2001 | Thuente |
| 6,571,170 | B2 | 5/2003 | Nakamura |
| 2002/0038178 | A1 | 3/2002 | Talkenberg et al. |

(Continued)

FOREIGN PATENT DOCUMENTS

| | | |
|---|---|---|
| JP | S63108285 A | 5/1988 |
| JP | S6453180 A | 3/1989 |

(Continued)

OTHER PUBLICATIONS

International Search Report and Written Opinion—PCT/US2012/056395—ISA/EPO—dated Dec. 21, 2012.

(Continued)

*Primary Examiner* — Harry K Liu
(74) *Attorney, Agent, or Firm* — Bala Ramasamy; Hunter Clark PLLC (57) ABSTRACT

Examples disclosed herein may relate to electronic devices, and more particularly to methods, apparatuses and articles of manufacture for use in a mobile device having one or more onboard sensors and a wireless signal based positioning capability.

30 Claims, 4 Drawing Sheets

(56) References Cited

U.S. PATENT DOCUMENTS

| | | | |
|---|---|---|---|
| 2007/0118286 A1* | 5/2007 | Wang | G01C 21/165 |
| | | | 342/357.59 |
| 2007/0200752 A1 | 8/2007 | Van et al. | |
| 2007/0254676 A1* | 11/2007 | Pedigo | G01S 19/05 |
| | | | 455/456.6 |
| 2008/0262730 A1* | 10/2008 | Onome | G01C 21/28 |
| | | | 701/500 |
| 2009/0278738 A1 | 11/2009 | Gopinath | |
| 2011/0103432 A1 | 5/2011 | Tangudu et al. | |
| 2011/0106450 A1 | 5/2011 | Toda et al. | |
| 2011/0184646 A1 | 7/2011 | Wong et al. | |
| 2012/0116677 A1* | 5/2012 | Higgison | G01S 5/0027 |
| | | | 701/518 |
| 2012/0196679 A1* | 8/2012 | Newcombe | A63F 13/06 |
| | | | 463/36 |
| 2013/0099963 A1 | 4/2013 | Wu et al. | |

FOREIGN PATENT DOCUMENTS

| | | |
|---|---|---|
| JP | H04121618 A | 4/1992 |
| JP | H0777570 A | 3/1995 |
| JP | H08304090 A | 11/1996 |
| JP | 2010266402 A | 11/2010 |
| WO | WO-2009140168 | 11/2009 |

OTHER PUBLICATIONS

Zhijian L., et al., "Research on SINS/GPS Attitude Determination System", Aerospace Control, vol. 1, Dec. 30, 2003, pp. 27-31 and 42.

* cited by examiner

TECHNIQUES FOR AFFECTING A WIRELESS SIGNAL-BASED POSITIONING CAPABILITY OF A MOBILE DEVICE BASED ON ONE OR MORE ONBOARD SENSORS

This application is a divisional of U.S. patent application Ser. No. 13/622,818, entitled "Techniques for Affecting a Wireless Signal-Based Positioning Capability of a Mobile Device Based on One or More Onboard Sensors," filed Sep. 19, 2012, which claims priority from U.S. Provisional Application Ser. No. 61/549,539, filed Oct. 20, 2011, entitled, "Recovery From Position Outliers."

BACKGROUND

Field

The subject matter disclosed herein relates to electronic devices, and more particularly to methods, apparatuses and articles of manufacture for use in a mobile device having one or more onboard sensors and a wireless signal based positioning capability.

Information:

Satellite positioning systems (SPSs), such as the Global Positioning System (GPS) and the like, have enabled SPS receivers on mobile devices to generate position estimates for the mobile devices by processing signals received from transmitters aboard space vehicles ("SPS signals"). A position estimate generated by an SPS receiver may be referred to as a position fix. Typically, an SPS receiver will acquire SPS signals from four or more satellites of an SPS to generate a position fix. The SPS receiver may use these SPS signals to estimate distances (i.e., pseudoranges) to the four or more satellites. The pseudoranges may then be used, along with knowledge about the locations of the satellites, to generate the position fix for the mobile device.

When a position fix is desired, an SPS receiver of a mobile device may perform a search for SPS signals being received from space. If the SPS receiver has no knowledge of its current position or the current position of satellites of the SPS, this search may entail a full sky scan (which may be referred to herein as performing a search from a cold start) to acquire the satellites, which can be a very complex process. Because of its complexity, attempting to search for and acquire satellites from a cold start can consume significant energy and thus reduce battery life for a mobile device having an SPS receiver. In addition, in mobile devices having limited processing power, searching for SPS signals from a cold start can be very time consuming and thus delay the generation of the position fix. An untimely or delayed position fix may negatively impact applications which rely on position knowledge.

In some systems, assistance data may be used by an SPS receiver to reduce the complexity of the search for SPS signals. If assistance data is used, a position fix may be achieved more quickly and with less power consumption. By reducing power consumption, battery life may be extended. Assistance data may include, for example, a rough estimate of a current location of a mobile device, an estimate of SPS time, Doppler search window information, almanac and/or ephemeris data, as well as other forms of information. This assistance data may be obtained from various sources including, for example, a remote location server accessible through a wireless communication network, a wireless base station or access point associated with wireless communication network, information stored within the mobile device itself, and/or other sources.

While assistance data may allow a position fix to be obtained more quickly and with less energy expenditure, sometimes assistance data may be inaccurate or erroneous. As will be appreciated, the use of faulty assistance data can negatively impact the accuracy of a resulting position fix. In addition, it is often difficult to determine the accuracy of assistance data before the data is used. Any resulting errors in a position fix, therefore, may not be detected until one or more location-based applications that use the position fix data malfunctions.

SUMMARY

In an aspect, a mobile device may perform a method comprising: computing one or more inferences from one or more signals generated by one or more inertial sensors and/or environmental sensors; detecting an erroneous condition responsive to a comparison of the computed one or more inferences with an initial position; and, at least in part in response to the detection of the erroneous condition, affecting a process of the mobile device that is used to obtain a position fix.

In another aspect, an apparatus may be provided for use in a mobile device. Here, for example, the apparatus may comprise: means for computing one or more inferences from one or more signals generated by one or more inertial sensors and/or environmental sensors; means for detecting an erroneous condition responsive to a comparison of the computed one or more inferences with an initial position; and means for affecting a process of the mobile device that is used to obtain a position fix at least in part in response to the detection of the erroneous condition.

In accordance with still another aspect, a mobile device may be provided which comprises: one or more inertial sensors and/or environmental sensors; and one or more processing units to: compute one or more inferences from one or more signals to be generated by the one or more inertial sensors and/or environmental sensors; detect an erroneous condition to be responsive to a comparison of the one or more inferences to be computed with an initial position; and, at least in part in response to the detection of the erroneous condition, affect a process at the mobile device that is to be used to obtain a position fix.

In accordance with yet another aspect, an article of manufacture may be provided which comprises: a non-transitory computer readable medium having stored therein computer implementable instructions executable by a mobile device to: compute one or more inferences from one or more signals to be generated by the one or more inertial sensors and/or environmental sensors on a mobile device; detect an erroneous condition to be responsive to a comparison of the one or more inferences to be computed with an initial position; and, at least in part in response to the detection of the erroneous condition, affect a process of the mobile device that is to be used to obtain a position fix.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

As illustrated by the examples herein, various methods, apparatuses and articles of manufacture may be implemented in a mobile device having at least one wireless signal-based positioning capability and one or more onboard sensors.

The underlying techniques provided by the examples herein may, for example, be implemented such that a mobile device provisioned with a wireless signal-based positioning capability (e.g., one or more processes, circuits, etc.) may be affected under certain conditions based on additional information that may be obtained using the one or more onboard sensors (e.g., inertial sensor(s), environmental sensor(s)).

By way of an initial example, a mobile device may be provisioned with a wireless signal-based positioning capability that determines and/or makes use of one or more positioning parameters associated with one or more wireless positioning signals as received from one or more transmitting devices. For example, a wireless signal-based positioning capability may estimate a position of the mobile device by generating and/or using one or more positioning parameters, such as, e.g., one or more pseudoranges, one or more pseudorange rates, an estimated velocity, an estimated heading, an estimated elevation/altitude, one or more estimated position coordinates, and/or the like or some combination thereof.

Unfortunately, under certain conditions, one or more of the positioning parameters that may be generated and/or otherwise used by a wireless signal-based positioning capability may comprise one or more errors or may be based, at least in part, on one or more errors, which may be significant enough to reduce the effectiveness and/or reliability of all or part of a position fix and/or other estimated positioning information regarding the mobile device. For example, an error in a pseudorange from a transmitting device and the mobile device may render a position fix or other positioning information unreliable. For example, an error in an estimated velocity and/or an estimated heading may render a position fix and/or other positioning information unreliable.

The techniques provided herein may be implemented, for example, to allow a mobile device to further consider one or more other positioning parameters associated with the mobile device but which are obtained using one or more onboard sensors. Thus, as described in greater detail herein, under certain conditions one or more sensor-based positioning parameters may be considered, possibly along with one or more wireless signal-based positioning parameters, to affect an indication of uncertainty with regard to one or more sensor-based positioning parameters, and/or an indication of a position uncertainty with regard to the mobile device.

For example, in certain implementations a mobile device may determine a first positioning parameter (e.g., based, at least in part, on a wireless positioning signal received by the mobile device) and a second positioning parameter (e.g., based, at least in part, on a signal generated by a sensor of the mobile device), and affect an indication of uncertainty with regard to at least the first positioning parameter based, at least in part, on the first positioning parameter and the second positioning parameter. Here, for example, if a first positioning parameter specifies an estimated velocity of 5.0 km/h and the second positioning parameter specifies an estimated velocity measurement of 4.7 km/h, then in certain instances an indication of uncertainty with regard to at least the first positioning parameter may be affected (if needed) to indicate a relatively low level of uncertainty, since the difference between these compared values may fall within an acceptable threshold level or range (e.g., of ±0.5 km/h, and/or some applicable percentage based threshold, etc.). Conversely, for example, if a first positioning parameter specifies estimated velocity of 100 km/h and the second positioning parameter specifies estimated measurement of 4.7 km/h, then in certain instances an indication of uncertainty with regard to at least the first positioning parameter may be affected (if needed) to indicate a relatively high level of uncertainty, since such a difference between these compared values clearly fall outside the example acceptable threshold level arrange of ±0.5 km/h, and/or some applicable percentage based threshold, etc. Of course, as with all of the examples provided herein these are just a few illustrative examples which are not intended to limit claimed subject matter.

In certain further example implementations, such a mobile device may, for example, estimate a position of the mobile device (e.g., a position fix) based, at least in part, on the first positioning parameter, and affect an indication of position uncertainty with regard to the estimated position of the mobile device based, at least in part, on the indication of uncertainty. Thus, for example, a wireless signal-based positioning capability may be affected based, at least in part, on an indication of uncertainty with regard to at least the first positioning parameter, and/or in indication of a position uncertainty with regard to the mobile device.

In certain example implementations, affecting an indication of uncertainty may, for example, further comprise determining a difference value based, at least in part, on the first positioning parameter and the second positioning parameter, and affecting the indication of uncertainty based, at least in part, on a comparison of the difference value with a threshold value, e.g. as illustrated in the previous examples.

In certain example implementations, a first positioning parameter may be based, at least in part, on an estimated pseudorange from a transmitter of the wireless positioning signal (e.g., a satellite positioning system (SPS) signal, a terrestrial-based positioning system signal, etc.) to the mobile device. For example, in certain implementations, a first positioning parameter may comprise or otherwise be based, at least in part, on an estimated velocity, a pseudorange rate, and/or the like or some combination thereof of the mobile device.

In certain example implementations, a second positioning parameter may be based, at least in part, on an estimated velocity measurement and/or some other like measurement of the mobile device that is determined based on one or more signals from one or more sensors. For example, in certain implementations an estimated velocity may be inferred from sensed measurements as result of acceleration/deceleration experienced by the mobile device, and/or a lack thereof (e.g., integrated or otherwise processed in some manner over a period of time, etc.).

In certain example implementations, a mobile device may determine a motion mode which may correspond to its motion and/or lack thereof within an environment based, at least in part, on one or more inertial and/or environmental sensor measurements. For example, a motion mode may indicate that a mobile device appears to have remained stationary for a period of time, e.g., due to a lack of detected movements. At other times, a motion mode may, for example, indicate that a mobile device may be being carried by a person who is walking, running, etc., e.g. due to the detected movements that may be characterized as steps or strides. For example, a motion mode may indicate that a mobile device may be onboard a moving vehicle, aircraft, elevator, escalator, etc., e.g., due to certain characterized movements, changes in elevation/altitude, etc. Accordingly, in certain example implementations, a second positioning parameter may be based, at least in part, on a motion mode of the mobile device and a motion mode may be based on one or more signals obtained from one or more sensors. Various capabilities, such as pedometer capabilities and/or the like, which may be implemented to characterize a motion mode are well known and beyond the scope of the present description.

In accordance with certain other aspects, an example mobile device may compute one or more inferences (e.g., one or more positioning parameters, etc.) from one or more signals generated by one or more inertial sensors and/or one or more environmental sensors. Such a mobile device may, for example, further detect an erroneous condition responsive to a comparison of the computed one or more inferences with an initial position and/or a position fix, and in response to the detection of the erroneous condition, restart a process at the mobile device to obtain a position fix independently of the initial position. In certain implementations, an initial position may, for example, be obtained from and/or using assistance data that may be obtained from one or more other devices. In certain implementations, a mobile device may obtain all or part of a position fix based, at least in part, on an acquisition of a plurality of wireless positioning signals at the mobile device. In certain implementations, a mobile device may, for example, obtain all or part of a position fix using ephemeris information, almanac information, and/or the like or some combination thereof. In certain example implementations, restarting a process at the mobile device to obtain a position fix may further comprise initiating a full sky scan and/or the like to acquire one or more wireless positioning signals.

In certain implementations, in detecting an erroneous condition a mobile device may, for example, compare a pseudorange rate and/or the like based, at least in part, on an acquired wireless positioning signal (e.g., SPS signal, etc.) with a velocity inferred from processing one or more signals generated by one or more inertial sensors. In certain implementations, in detecting erroneous condition mobile device may, for example, compare an inference computed from processing one or more signals from an environmental sensor with an initial position or a position fix.

Figure 1:
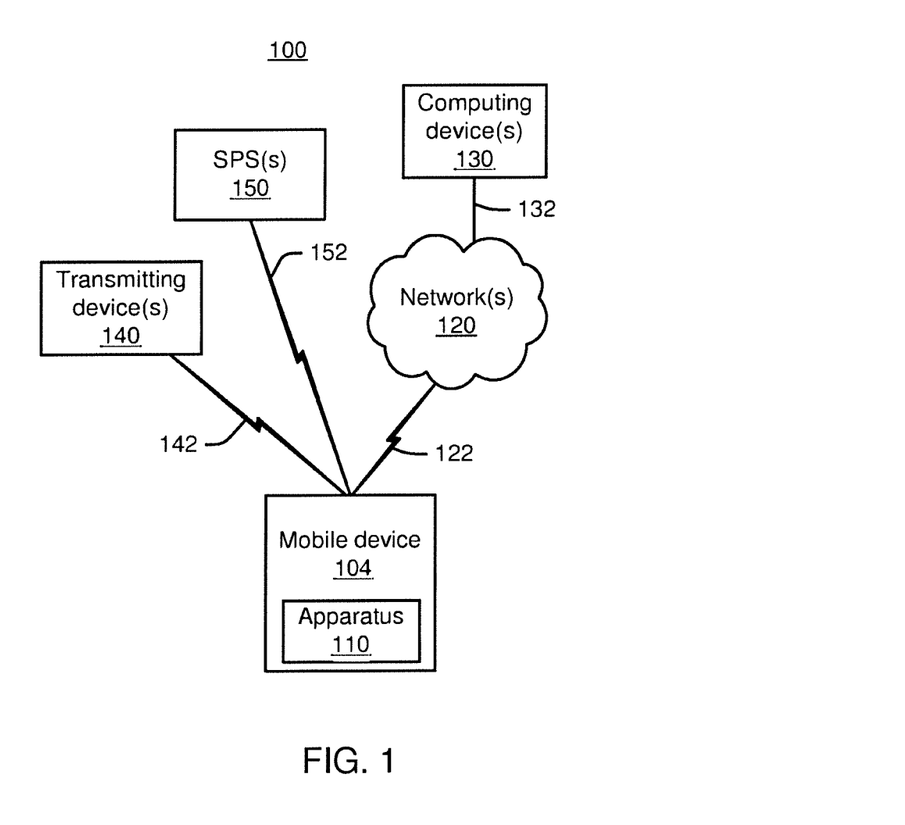
FIG. 1 is a schematic block diagram illustrating an example environment that includes a mobile device, in accordance with an example implementation.

Attention is drawn now to FIG. 1, which is a schematic block diagram illustrating an example environment 100 that includes a mobile device 104, in accordance with an example implementation.

As shown, mobile device 104 comprises an apparatus 110 to provide or otherwise support mobile device positioning based, at least in part, on one or more of the techniques provided herein. Apparatus 110 may represent one or more computing platforms that may communicate with one or more computing devices 130, either directly (e.g. not shown) and/or indirectly, e.g. via one or more network(s) 120. For example, as shown, apparatus 110 may, at times, communicate with one or more computing device(s) 130 via with network(s) 120 over a wireless communication link 122 and wired communication link 132. It should be understood that while communication link 122 is illustrated as a wireless communication link and communication link 132 is illustrated as a wired communication link, either of these communication links may comprise wired and/or wireless communication links.

Network(s) 120 may comprise one or more communication systems and/or data networks having various interconnected devices supporting communication between various electronic devices, such as mobile device 104 and one or more computing devices 130. For example, communication between computing device 130 and mobile device 104 may allow for certain data and/or instructions to be exchanged there between. For example, in certain instances, assistance data may be obtained by mobile device 104 from one or more computing devices 130. It should be kept in mind that in certain implementations one or more computing devices 130 may be provisioned within one or more network(s) 120.

As used herein a "mobile device" may represent any electronic device that may be moved about either directly or indirectly by a user within environment 100. As mentioned, in certain implementations, mobile device 104 may be capable of communicating with one or more computing device(s) 130, and/or other like resources that may be provided within a network(s) 120. Here, for example, mobile device 104 may take the form of a smart phone, a tablet computer, a laptop computer, a tracking device, etc. In certain other implementations, mobile device 104 may be incapable of transmitting wireless signals or otherwise transmitting wired signals to other devices, but may be capable of receiving wireless signals, e.g., wireless positioning signals. Here, for example, mobile device 104 may take the form of a navigation device and/or the like.

Example environment 100 further includes one or more satellite positioning system(s) (SPS) 150 which may transmit one or more wireless positioning signals, e.g. SPS signals 152, to mobile device 104. SPS 150 may, for example, represent one or more Global Navigation Satellite System (GNSS), one or more regional navigation satellite systems, and/or the like or some combination thereof. Additionally, one or more terrestrial-based positioning systems may be provided as represented by example transmitting device(s) 140 capable of transmitting one or more wireless positioning signals, e.g., wireless positioning signals 142 all or some of which may be used for signal-based positioning. Thus, for example, transmitting device(s) 140 may represent a wireless access point, a base station, a repeater, a dedicated beacon transmitting device, just to name a few examples, which have known positions. SPS signals 152 and/or wireless signals 142 may, at times, be acquired by mobile device 104 and used to estimate its position.

Figure 2:
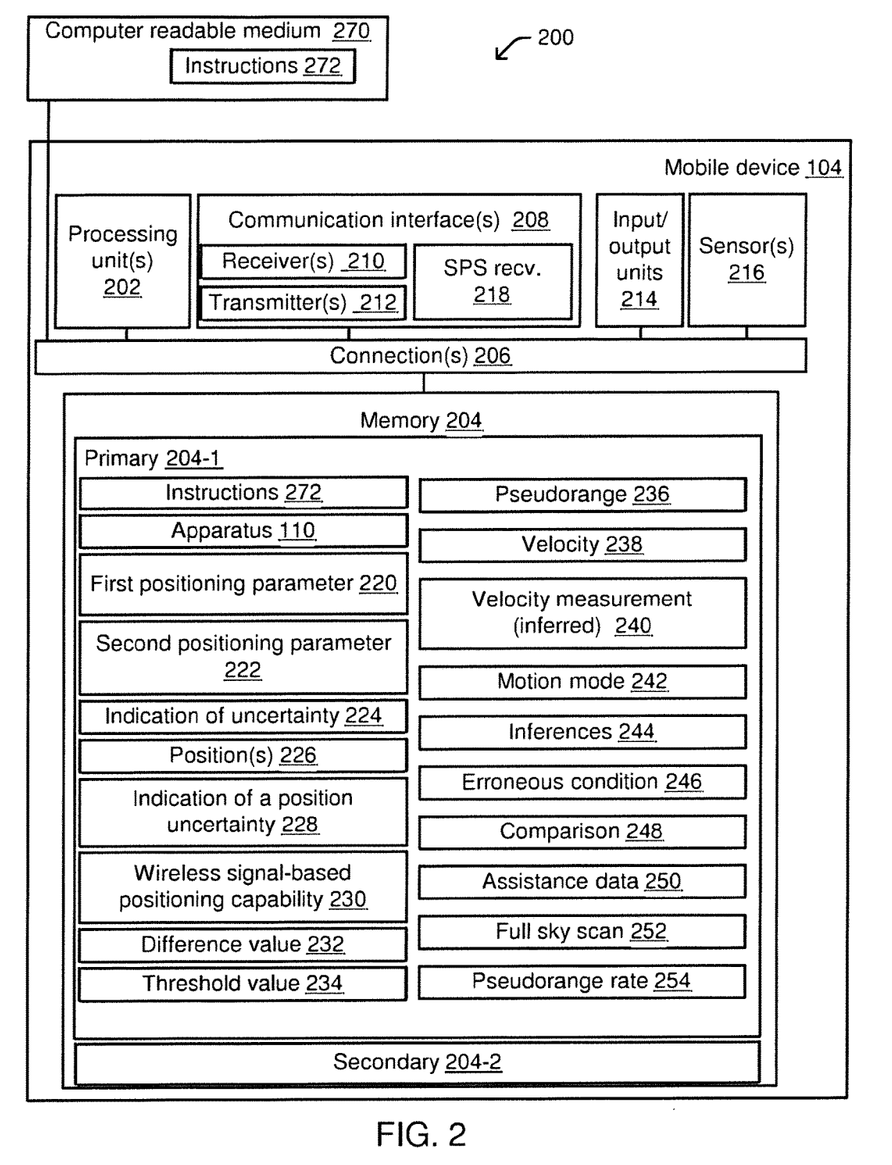
FIG. 2 is a schematic block diagram illustrating certain features of an example computing platform in a mobile device, in accordance with an example implementation.

Attention is drawn next to FIG. 2, which is a schematic block diagram illustrating certain features of an example computing platform 200 in a mobile device 104 to provide or otherwise support mobile device positioning, in accordance with an example implementation.

As illustrated computing platform 200 may comprise one or more processing units 202 to perform data processing (e.g., in accordance with the techniques provided herein, and/or apparatus 110, etc.) coupled to memory 204 via one or more connections 26. Processing unit(s) 202 may, for example, be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within mobile device 104. Secondary memory 204-2 may comprise, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to, a non-transitory computer readable medium 270. Memory 204 and/or non-transitory computer readable medium 270 may comprise instructions 272 associated with data processing, e.g., in accordance with the techniques and/or example apparatus 110 (FIG. 1) and/or all or part of one or more example processes 300 (FIG. 3) and/or 400 (FIG. 4), as provided by way of example herein.

Computing platform 200 may, for example, further comprise one or more communication interface(s) 208. Communication interface(s) 208 may, for example, provide connectivity to network(s) 120, computing device(s) 130, one or more transmitting devices 140, and/or one or more SPS 150 (FIG. 1), e.g., via one or more wired and/or wireless communication links (as applicable). As illustrated here communication interface(s) 208 may, for example, comprise one or more receivers 210, one or more transmitters 212, one or more SPS receivers 218, and/or the like or some combination thereof. Communication interface(s) 208 may implement one or more communication protocols as may be required to support one or more wired and/or wireless communication links. Communication interface(s) 208 may, in certain example instances, further comprise one or more receivers capable of acquiring wireless positioning signals 142 from one or more transmitting devices 140 associated with one or more terrestrial-based positioning systems. In certain instances, communication interface 208 may also transmit wireless signals via one or more transmitters 212 to one or more transmitting devices 140, e.g., as part of a round trip time valuation process, etc. Further, in certain example instances, communication interface(s) 208 may comprise an SPS receiver 218 capable of acquiring SPS signals 152, e.g., in support of one or more signal-based positioning capabilities.

In accordance with certain example implementations, communication interface(s) 208 and/or other resources in network(s) 120 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TOMA) network, a Frequency Division Multiple Access (FDMA) network, an Orthogonal Frequency Division Multiple Access (OFDMA) network, a Single Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCOMA), to name just a few radio technologies. Here, cdma2000 may include technologies implemented according to IS-95, IS-2000, and IS-856 standards. A TOMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, communication interface(s) 208 and/or communication interface(s) 308 may further provide for infrared-based communications with one or more other devices.

SPS receiver 218 may, for example, represent any type of receiver capable of receiving SPS signals from positioning satellites and processing the signals to provide one or more position estimates for a mobile device. SPS receiver 218 may, for example, be configured to operate with any existing or future SPS system including, for example, the Global Positioning System (GPS), the GLONASS system, the Compass system, the Galileo system, the IRNSS system, the GNSS system and other systems that use Satellite Based Augmentation Systems (SBASs) and/or Ground Based Augmentations Systems (GBASs), and/or other satellite navigation systems. In some implementations, one or more of the processes or techniques described herein may be implemented, either partially or fully, within SPS receiver 218 or a similar structure (e.g., fully or partially within one or more processing units 202 and/or one or more processing units within SPS receiver 218, and/or the like or some combination thereof). It should be appreciated that the architecture illustrated for computing platform 200 within mobile device 104 represents one possible example of an architecture that may be used in an implementation. Other architectures may alternatively be used. It should also be appreciated that all or part of the various devices, processes, or articles of manufacture, etc., described herein may be implemented using any combination of software and hardware and/or firmware, etc.

In addition to SPS receiver 218 to acquire and process signals from an SPS or receiver(s) 210/transmitter(s) 212 to acquire and process signals from network(s) 120 and/or transmitting devices 140 (FIG. 1), mobile device 104 may comprise one or more sensors 216, which may represent one or more environmental sensors (e.g., one or more magnetometers, one or more temperature sensors, one or more microphones, one or more barometers, one or more altimeters, one or more light sensors, one or more cameras, etc.) and/or one or more inertial sensors (e.g., one or more accelerometers, one or more gyroscopes, etc.). In a particular implementation, an error condition, such as an outlier, may be detected based, at least in part, on an evaluation of one or more sensor signals received at a current location with a recent position fix or other information such as positioning assistance data. For example, an initial position (e.g., rough position) or recent SPS position fix may be evaluated for consistency with one or more readings, signals or inferences drawn from one or more signals generated by one or more environmental and/or one or more inertial sensors. Thus, for example, in certain implementations, if an initial position or possibly a recent/previous SPS position fix is not consistent with one or more readings, signals or inferences (e.g., second positioning parameters) that may be drawn from one or more sensor signals, it may be presumed that an error condition exists. In response to detection of an error condition, in a particular aspect, an indication of uncertainty with regard to one or more positioning parameters, a position fix, and/or other like position information may be affected in some manner. In another particular aspect, responsive to detection of the error condition in all or a portion of information obtained from acquisition of the SPS signals at SPS receiver 218, a process to attempt to reacquisition of SPS signals at SPS receiver 218 may be restarted or otherwise initiated or operatively affected in some manner. Here, for example, one or more processes associated with a wireless signal-based positioning capability may be restarted and/or affected in some other manner.

In certain instances it may, for example, be assumed that there is at least a strong possibility that assistance data relied upon in obtaining the erroneous position fix was inaccurate or erroneous. Accordingly, in another aspect, a re-acquisition of SPS signals (e.g., following detection of an error condition as discussed above) may be performed without at least some if not all of the assistance data that was relied upon in an initial computation of the position fix. For example, with the presence of certain detected error conditions, there may be a significant likelihood that assistance data such as an initial position and/or estimate of SPS time is erroneous. Accordingly, all or part of such particular assistance data may be discarded or ignored. Other data that may be discarded or ignored, in whole or part, upon detecting an error condition may include, for example, clock frequency, bias estimate, GNSS measurements, space vehicle steering and/or space vehicle directions. In certain instances, other assistance data, such as almanac and/or ephemeris, may be presumed to be very reliable. As such, almanac and/or ephemeris data may be used to obtain a subsequent position fix.

In certain example implementations, an error condition may be detected from a comparison of one or more positioning parameters that may be based, at least in part, on one or more acquired SPS signals with one or more other positioning parameters that may be based, at least in part, on one or more signals obtained from one or more onboard sensors. For example, a pseudorange rate (PRR) and/or an estimated velocity obtained from acquisition of an SPS signal at a mobile device may be compared with an estimated velocity measurement of the mobile device as determined from processing inertial sensor signals, etc. Thus, for example, if there is a significant divergence between an estimated velocity and corresponding estimated velocity measurement, there may be a significant likelihood that an SPS position fix and/or other like positioning information may be erroneous. In certain example implementations, as previously mentioned, one or more threshold values may be taken into consideration in detecting errors and/or erroneous conditions of varying types. It should be recognized that such threshold values may be predetermined and/or dynamically determined depending upon the implemented design. Also, as previously mentioned, in certain instances one or more indications of uncertainty with regard to one or more positioning parameters and/or one or more indications of position uncertainty with regard to mobile device 104 may be affected based, at least in part, on a detected error and/or lack thereof. In certain example implementations, a sensor high confidence-static vs. low-redundancy GNSS high-speed offset detection may be an effective scheme to detect an error.

Given that the use of a full sky scan may, at times, heavily tax a power supply (e.g., battery, etc.) of a mobile device, it may be appreciated that there may be a trade-off between extending or conserving the electrical power and correcting for error conditions. Thus, in certain instances, criteria for testing the fitness of a computed position fix and/or other like positioning information may be set or adjusted according to a need for preserving electrical power of a mobile device.

As further illustrated in FIG. 2, a mobile device 104 may, for example, further comprise one or more input/output units 214. Input/output units 214 may represent one or more devices or other like mechanisms that may be used to obtain inputs from and/or provide outputs to one or more other devices and/or a user of mobile device 104. Thus, for example, input/output units 214 may comprise various buttons, switches, a touch pad, a trackball, a joystick, a touch screen, a microphone, a camera, and/or the like, which may be used to receive one or more user inputs. In certain instances, input/output units 214 may comprise various devices that may be used in producing a visual output, an audible output, and/or a tactile output for a user. In one example implementation, input/output units 214 may comprise a display capable of rendering all or part of displayable image data and/or the like with regard to a positioning fix, a wireless signal-based positioning capability, some aspect of environment 100, etc.

As illustrated mobile device 104 may comprise one or more processing units 202 to perform data processing (e.g., in accordance with the techniques provided herein) coupled to memory 204 via one or more connection(s) 206 (e.g., one or more conductors, one or more conductive paths, one or more fibers, one or more buses, one or more interfaces, etc.). Processing unit(s) 202 and/or instructions 272 may, for example, provide or otherwise be associated with one or more signals that may be stored in memory 204 from time to time, such as: instructions 272; apparatus 110; one or more first positioning parameters 220 (e.g., based, at least in part, on one or more wireless positioning signals); one or more second positioning parameters 222 (e.g., based, at least in part, on one or more signals generated by or obtained from one or more sensors); one or more indications of uncertainty 224 (e.g., associated with one or more first or second positioning parameters); one or more estimated positions 226; one or more indications of a position uncertainty 228 (e.g., associated with one or more estimated positions, and/or other positioning information); a wireless signal-based positioning capability 230; a difference value 232 (e.g., based, at least in part, on a comparison of at least a first positioning parameter with a second positioning parameter); one or more threshold values 234; one or more (estimated) pseudoranges 236; one or more estimated velocities 238; one or more estimated velocity measurements 240 (e.g., inferred from one or more sensor signals); a motion mode 242; one or more inferences 244 (e.g. associated with an initial position and/or a position fix, etc.); an erroneous condition 246 (e.g., possibly associated with one or more errors and/or lack thereof); a comparison value 248; assistance data 250; a full sky scan 252 and/or other like process/capability; one or more (estimated) pseudorange rates 254 (e.g., based, at least in part, on one or more wireless positioning signals); and/or the like or some combination thereof.

Figure 3:
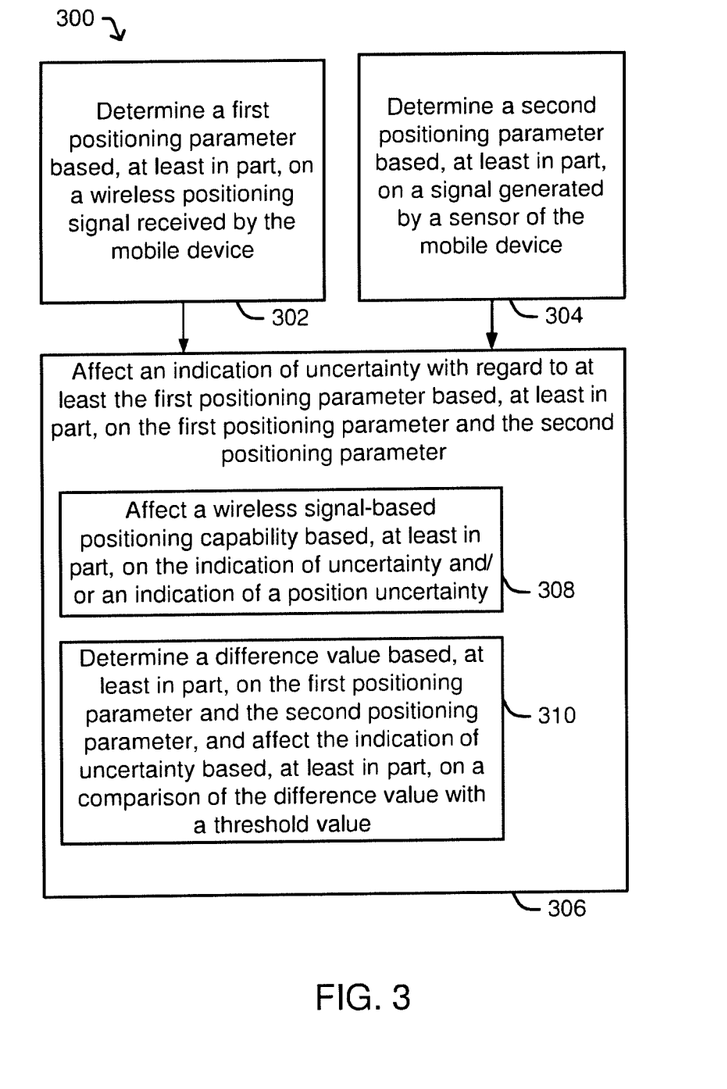
FIG. 3 is a flow diagram illustrating an example process that may be implemented in a computing platform of a mobile device, in accordance with an example implementation.

Attention is drawn next to FIG. 3, which is a flow diagram illustrating an example process 300 that may be implemented in a computing platform 200 of a mobile device 104, in accordance with an example implementation.

At example block 302, a first positioning parameter may be determined based, at least in part, on a wireless positioning signal received by the mobile device. For example, in certain implementations, one or more wireless positioning signals may be acquired from one or more terrestrial-based transmitting devices and/or one or more SPS. As used herein, the term "first positioning parameter" is intended to represent any information that may be based, at least in part, on one or more wireless positioning signals and which may be represented by one or more electrical signals and which may be of use in a wireless signal-based positioning capability and/or other like positioning capabilities provisioned within the mobile device. Thus, by way of some non-limiting examples, a first positioning parameter may comprise or relate to one or more of: an estimated velocity, an estimated pseudorange rate, an estimated pseudorange, an estimated elevation/altitude, a particular time, an estimated heading, all or part of a position coordinate, and/or the like or some combination thereof.

At example block 304, a second positioning parameter may be determined based, at least in part, on one or more signals generated by one or more sensors of the mobile device. Example, in certain implementations, one or more signals may be generated by or otherwise obtained from one or more inertial sensors on board the mobile device, and/or one or more environmental sensors on board mobile device. As used herein, the term "second positioning parameter" is intended to represent any information that may be based, at least in part, on one or more signals from one or more sensors and which may be represented by one or more electrical signals and which may be of use in comparison with and/or otherwise considered with respect to one or more first positioning parameters. Thus, by way of some non-limiting examples, a second positioning parameter may comprise or relate to one or more of an estimated velocity measurement (e.g. based on detected acceleration/deceleration over time, etc.), one or more detected movements of the mobile device within environment 100, an estimated elevation/altitude (e.g., based on barometric pressure, etc.), the particular time (e.g., day or night based on sensed ambient light conditions, follow-on solicited user input, etc.), an estimated heading (e.g., based on a magnetometer, a compass capability, etc.), all or part of a position coordinate (e.g., based on dead reckoning, follow-on solicited user input, etc.), and/or the like or some combination thereof.

At example block 306, an indication of uncertainty with regard to at least the first positioning parameter may be affected in some manner based, at least in part, on the first positioning parameter and the second positioning parameter. For example, an indication of uncertainty with regard to at least a first positioning parameter may be affected (if needed) to indicate a higher or lower level of uncertainty based on an absence or presence, respectively, of a detected erroneous condition, a possible error, a failed threshold value test, etc., and/or some combination thereof. In certain implementations, at example block 306, an implicit assumption may be that a particular second positioning parameter corresponding to a sensor is considered to be sufficiently reliable with regard to the first positioning parameter so as to affect the indication of uncertainty with regard to at least a first positioning parameter. Thus, for example, in certain implementations rather than rely on such an implicit assumption, additional racks may be performed to verify or otherwise ascertained that one or more second positioning parameters may be considered to be sufficiently reliable for use in affecting the indication of uncertainty with regard to a first positioning parameter. For example, a second positioning parameter may be compared to a corresponding reliability threshold value. For example, second positioning parameter may be considered more or less reliable depending upon the source sensor(s), a number of sample measurements obtained, the length of time over which sample measurements have been obtained, etc.

In certain instances, at block 308, a wireless signal-based positioning capability may be affected based, at least in part, on the indication of uncertainty and/or an indication of a position uncertainty. Here, for example, a wireless signal-based positioning capability may be restarted and/or otherwise operatively affected in some manner based, at least in part, on such an indication of uncertainty and/or such an indication of a position uncertainty. In certain example implementations, a wireless signal-based positioning capability may be determined to be in an error state and/or as having one or more erroneous conditions based, at least in part, on the indication of uncertainty and/or an indication of a position uncertainty. Thus, for example, in response to certain error states and/or the like mobile device 104 may initiate certain error recovery mechanisms. For example, an error recovery mechanism may affect and/or delete all or part of available assistance data and/or the like, and/or possibly ignore or affect all or part of new incoming assistance data and/or the like (e.g., with the assumption that all or part of such data may be related in some manner to the error state). It should be kept in mind that in error state and/or the like may be declared for various reasons which may be unknown at the time, and possibly even indeterminable. For example, an error state and/or the like may occur based on data relating to an initial position, an initial time, assistance data, clock frequency, etc. accordingly, in certain implementations, to recover from such an error state and/or the like, mobile device 104 may delete or ignore or otherwise affect certain data, restart one or more processes/capabilities.

In certain instances, at block 310, a difference value may be determined based, at least in part, on the first positioning parameter and the second positioning parameter, and the indication of uncertainty may be affected based, at least in part, on a comparison of the difference value with a threshold value. Thus for example, certain instances, an erroneous condition or other possible error may be detected based, at least in part, on whether or not certain threshold tests are satisfied.

Figure 4:
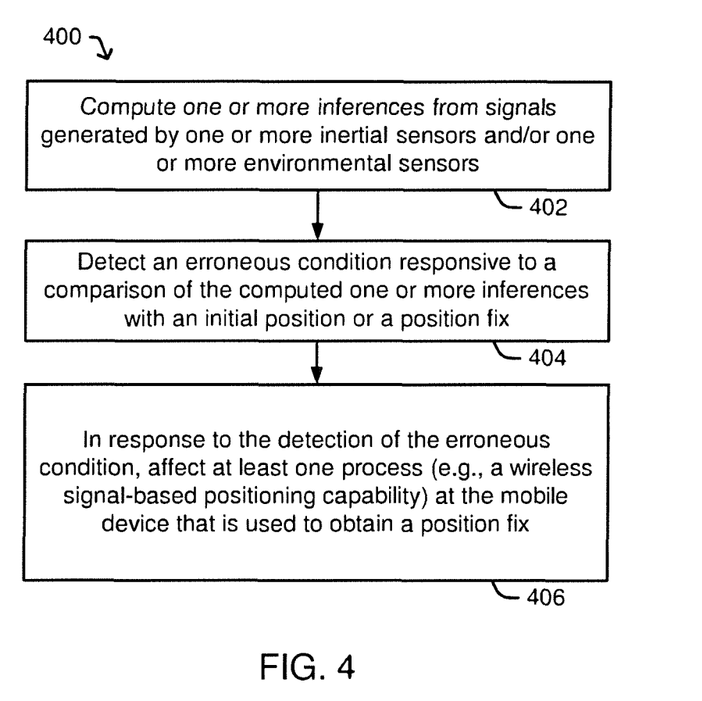
FIG. 4 is a flow diagram illustrating yet another example process that may be implemented in a computing platform of a mobile device, in accordance with an example implementation.

Attention is drawn next to FIG. 4, which is a flow diagram illustrating yet another example process 400 that may be implemented in a computing platform 200 of a mobile device 104, in accordance with an example implementation. At example block 402, one or more inferences may be computed from one or more signals generated by one or more inertial sensors and/or one or more environmental sensors. Here, for example, one or more second positioning parameters may be determined or otherwise inferred.

At example block 404, an erroneous condition may be detected in response to a comparison of the computed one or more inferences with an initial position and/or one or more other position fixes. Here, for example, one or more erroneous conditions may be detected in initial position and/or one or more position fixes by comparing one or more first positioning parameters associated there with, with one or more second positioning parameters, e.g., as computed/inferred at block 402. In certain example implementations, an erroneous condition may be detected based on one or more threshold tests, and/or the like, at block 404.

At example block 406, in response to the detection of one or more erroneous conditions, one or more processes may be restarted and/or otherwise affected at the mobile device, e.g. to obtain a new position fix independently of the initial position and/or some previous position fix. Here, for example, a wireless signal-based positioning capability and/or other like positioning process(es) may be restarted in some manner and/or operated in some manner to affect a full sky scan and/or other like wireless positioning signal search technique(s).

In certain example implementations, affecting the process at the mobile device may comprise restarting the process, e.g., in an attempt to obtain a position fix independently of the initial position. In certain other example limitations, affecting the process at the mobile device may comprise affecting at least a portion of assistance data used by the process to obtain the position fix. Here, for example, a portion of assistance data may be ignored, modified, or possibly deleted. In certain example implementations, affecting at least a portion of assistance data used by the process to obtain the position fix may further comprise determining that certain assistance data may have contributed to the erroneous condition. For example, certain assistance data may be deemed to be out of date, and/or to have erroneous information (e.g., based on differences to expected values, threshold values, etc.) which may have contributed to erroneous condition. In response to a determination that certain assistance data may have contributed to an erroneous condition, a mobile device may, for example, permit the process to ignore all or part of the suspect assistance data, possibly affect all or part of the suspect assistance data prior to use by the process, and/or identify part of the suspect assistance data to one or more other computing devices (e.g., corresponding to a provider of such assistance data, etc.

The techniques provided herein may be implemented to allow a variety of different first and second positioning parameters and/or a corresponding threshold values to be taken into consideration. For example as described previously, parameters associated with velocity, heading, position coordinates, altitude/elevations, etc., may be compared or otherwise considered to determine whether or not certain positioning information may be more or less reliable. For example, as previously mentioned, if a velocity or heading for position coordinate or altitude/elevation based on one or more sensors seems at odds with similar information based on one or more wireless positioning signals, then an erroneous condition may exist.

Although the examples presented above tend to relate to individual parameters and/or other like measurements, it should be understood however that in certain implementations a plurality of parameters and/or other like measurements may be taken into consideration, e.g., obtained over a period time, etc., to possibly reduce false positives/negatives in detecting erroneous conditions and/or affecting an indication of uncertainty with regard to one or more positioning parameters, and/or affecting an indication of a position uncertainty with regard to the mobile device.

In certain further implementations, in response to certain conditions or results, based on the techniques herein, a mobile device may be operated to interact with one or more other devices and/or possibly solicit information from its user via one or more user inputs, which may be used to modify or otherwise affect an operation of the mobile device or one or more processes performed therein. For example, in response to an erroneous condition, an attempt to obtain certain assistance data may be initiated. For example, in response to an erroneous condition, certain user input may be solicited which may help to resolve all or part of erroneous condition or otherwise affect operation of the mobile device or some process performed therein.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as processing, computing, calculating, determining, establishing, generating, obtaining, accessing, identifying, setting, applying, affecting, associating, and/or the like may refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

The invention claimed is:

1. A method comprising, on a mobile device:
   determining an initial position of the mobile device;
   computing one or more inferences from one or more signals generated by one or more inertial sensors or one or more environmental sensors, or a combination thereof;
   detecting an erroneous condition by comparing the computed one or more inferences with the initial position;
   affecting a process of the mobile device that is used to obtain a subsequent position fix at least in part in response to the detection of the erroneous condition; and
   obtaining the subsequent position fix for the mobile device using the affected process.

2. The method of claim 1, wherein the affecting the process of the mobile device further comprises restarting the process to obtain the subsequent position fix independently of the initial position.

3. The method of claim 1, wherein the affecting the process of the mobile device further comprises affecting at least a portion of one or more assistance parameters used by the process to obtain the subsequent position fix.

4. The method of claim 3, wherein the affecting the at least the portion of the one or more assistance parameters used by the process to obtain the subsequent position fix further comprises:
   determining that certain assistance parameters contributed to the erroneous condition; and:
   with the process, ignoring the certain assistance parameters;
   affecting the certain assistance parameters prior to use by the process; or
   identifying the certain assistance parameters to one or more other computing devices; or a combination thereof.

5. The method of claim 1, wherein the initial position is obtained from one or more assistance parameters.

6. The method of claim 1, wherein the affecting the process that is used to obtain the subsequent position fix further comprises:
   obtaining the subsequent position fix based, at least in part, on acquisition of a plurality of SPS signals at the mobile device.

7. The method of claim 6, wherein the obtaining the subsequent position fix further comprises obtaining the subsequent position fix using ephemeris or almanac parameters, or a combination thereof.

8. The method of claim 1, wherein the affecting the process of the mobile device that is used to obtain the subsequent position fix further comprises:
   initiating a full sky scan to acquire one or more satellite positioning system (SPS) signals.

9. The method of claim 1, wherein the detecting the erroneous condition further comprises:
   comparing a pseudorange rate of an acquired satellite positioning system (SPS) signal with a velocity inferred from processing a signal generated by an inertial sensor.

10. The method of claim 1, wherein the detecting the erroneous condition further comprises comparing an inference computed from processing one or more signals from an environmental sensor with the initial position.

11. An apparatus for use in a mobile device, the apparatus comprising:
    means for determining an initial position of the mobile device;
    means for computing one or more inferences from one or more signals generated by one or more inertial sensors or one or more environmental sensors, or a combination thereof;
    means for detecting an erroneous condition by comparing the computed one or more inferences with the initial position;
    means for affecting a process at the mobile device that is used to obtain a subsequent position fix at least in part in response to the detection of the erroneous condition; and
    means for obtaining the subsequent position fix for the mobile device using the affected process.

12. The apparatus of claim 11, further comprising:
    means for restarting the process to obtain the subsequent position fix independently of the initial position at least in part in response to the detection of the erroneous condition.

13. The apparatus of claim 11, further comprising:
    means for affecting at least a portion of one or more assistance parameters used by the process to obtain the subsequent position fix at least in part in response to the detection of the erroneous condition.

14. The apparatus of claim 13, further comprising:
    means for determining that certain assistance parameters contributed to the erroneous condition; and:

means for ignoring the certain assistance parameters by the process;
means for affecting the certain assistance parameters prior to use by the process; or
means for identifying the certain assistance parameters to one or more other computing devices; or
a combination thereof.

15. The apparatus of claim 11, further comprising:
means for comparing a pseudorange rate of an acquired satellite positioning system (SPS) signal with a velocity inferred from processing a signal generated by an inertial sensor.

16. A mobile device comprising:
one or more inertial sensors or one or more environmental sensors, or a combination thereof; and
one or more processing units configured to:
    determine an initial position of the mobile device;
    compute one or more inferences from one or more signals to be generated by the one or more inertial sensors and/or environmental sensors;
    detect an erroneous condition by comparing the one or more inferences with the initial position;
    affect a process at the mobile device that is to be used to obtain a subsequent position fix at least in part in response to the detection of the erroneous condition; and
    obtain the subsequent position fix for the mobile device using the affected process.

17. The mobile device of claim 16, wherein the one or more processing units are further configured to:
restart the process to obtain the subsequent position fix independently of the initial position at least in part in response to the detection of the erroneous condition.

18. The mobile device of claim 16, wherein the one or more processing units are further configured to:
affect at least a portion of one or more assistance parameters to be used by the process to obtain the subsequent position fix at least in part in response to the detection of the erroneous condition.

19. The mobile device of claim 18, wherein the one or more processing units are further configured to:
determine that certain assistance parameters will have contributed to the erroneous condition; and:
with the process, ignore the certain assistance parameters;
affect the certain assistance parameters prior to use by the process; or
initiate identification of the certain assistance parameters to one or more other computing devices; or
a combination thereof.

20. The mobile device of claim 16, wherein the initial position is to be obtained from one or more assistance parameters.

21. The mobile device of claim 16, and further comprising a communication interface; and wherein the one or more processing units are further configured to obtain the subsequent position fix based, at least in part, on acquisition of a plurality of satellite positioning system (SPS) signals via the communication interface.

22. The mobile device of claim 21, wherein the one or more processing units are further configured to obtain the subsequent position fix based at least in part on ephemeris parameters or almanac parameters, or a combination thereof.

23. The mobile device of claim 16, wherein the one or more processing units are further configured to initiate a full sky scan to acquire one or more satellite positioning system (SPS) signals.

24. The mobile device of claim 16, wherein the one or more processing units are further configured to compare a pseudorange rate of an SPS signal to be acquired with a velocity to be inferred based at least in part on a signal to be generated by an inertial sensor.

25. The mobile device of claim 16, wherein the one or more processing units are further configured to compare an inference to be computed based at least in part on one or more signals to be obtained from an environmental sensor with the initial position.

26. A non-transitory computer readable medium having stored therein computer implementable instructions executable by a mobile device to:
determine an initial position of the mobile device;
compute one or more inferences from one or more signals to be generated by one or more inertial sensors or one or more environmental sensors of a mobile device, or a combination thereof;
detect an erroneous condition by comparing the one or more inferences with the initial position; and
affect a process of the mobile device that is to be used to obtain a subsequent position fix at least in part in response to the detection of the erroneous condition; and
obtain the subsequent position fix for the mobile device using the affected process.

27. The computer readable medium of claim 26, the computer implementable instructions being further executable by the mobile device to:
restart the process to obtain the subsequent position fix independently of the initial position at least in part in response to the detection of the erroneous condition.

28. The computer readable medium of claim 26, the computer implementable instructions being further executable by the mobile device to:
affect at least a portion of one or more assistance parameters to be used by the process to obtain the subsequent position fix at least in part in response to the detection of the erroneous condition.

29. The computer readable medium of claim 28, the computer implementable instructions being further executable by the mobile device to:
determine that certain assistance parameters will have contributed to the erroneous condition; and:
with the process, ignore the certain assistance parameters;
affect the certain assistance parameters prior to use by the process; or
initiate identification of the certain assistance parameters to one or more other computing devices; or
a combination thereof.

30. The computer readable medium of claim 26, the computer implementable instructions being further executable by the mobile device to:
compare an inference to be computed based on one or more signals to be obtained from an environmental sensor with the initial position.

* * * * *